Dec. 17, 1957  O. K. KELLEY ET AL  2,816,630
FRONT WHEEL MOUNTING FOR DISC BRAKE
Filed Feb. 13, 1956  3 Sheets-Sheet 1

INVENTORS
OLIVER K. KELLEY
GILBERT K. HAUSE
BY Craig V. Morton
THEIR ATTORNEY

INVENTORS
OLIVER K. KELLEY
GILBERT K. HAUSE
BY Craig V. Morton
THEIR ATTORNEY

Dec. 17, 1957 O. K. KELLEY ET AL 2,816,630
FRONT WHEEL MOUNTING FOR DISC BRAKE
Filed Feb. 13, 1956 3 Sheets-Sheet 3

INVENTORS
OLIVER K. KELLEY
BY GILBERT K. HAUSE

Craig V. Morton
THEIR ATTORNEY

United States Patent Office 2,816,630
Patented Dec. 17, 1957

2,816,630

FRONT WHEEL MOUNTING FOR DISC BRAKE

Oliver K. Kelley, Bloomfield Hills, and Gilbert K. Hause, Franklin, Mich., assignors to General Motors Corporation, Detroit, Mich., a corporation of Delaware Application February 13, 1956, Serial No. 565,159

7 Claims. (Cl. 188—264)

This invention pertains to liquid cooled motor vehicle brakes, and particularly to a wheel structure per se adapted to circulate cooling fluid over a multiple disc brake.

Previous liquid cooled multiple disc brakes have generally provided flexible lines for connecting a heat exchanging means with brake housing fittings resulting in problems concerning leakage and sealing. Previous liquid cooled brakes have also presented problems regarding heat dissipation commensurate with the amount of heat generated in applying braking action sufficient to absorb and stop kinetic motion of a vehicle. The present invention is an improved wheel structure related to such brakes.

An object of this invention is to provide a wheel mounting structure incorporating a liquid-cooled disc brake wherein a spindle or kingpin mount for the front wheel is constructed and arranged to form part of and to provide the necessary communication between the brake cooling chambers.

Another object is to provide a liquid-cooled disc brake in which a positive-displacement fluid-circulating device is placed internally of the brake and actuated thereby upon brake actuation.

Another object of the present invention is to provide wheel structure for a liquid-cooled friction brake wherein the pump is driven by a rotating shaft or axle and the outer periphery of the pump housing carries rotatable but axially stationary discs of a brake.

Another object is to provide a vane carrier with a braking disc attached to an eccentric pump member cooperable with a disc brake means to cause pump actuation coincident with brake actuation.

Further objects and advantages of the present invention will be apparent from the following description, reference being had to the accompanying drawings wherein a preferred embodiment of the present invention is clearly shown.

Figure 1:
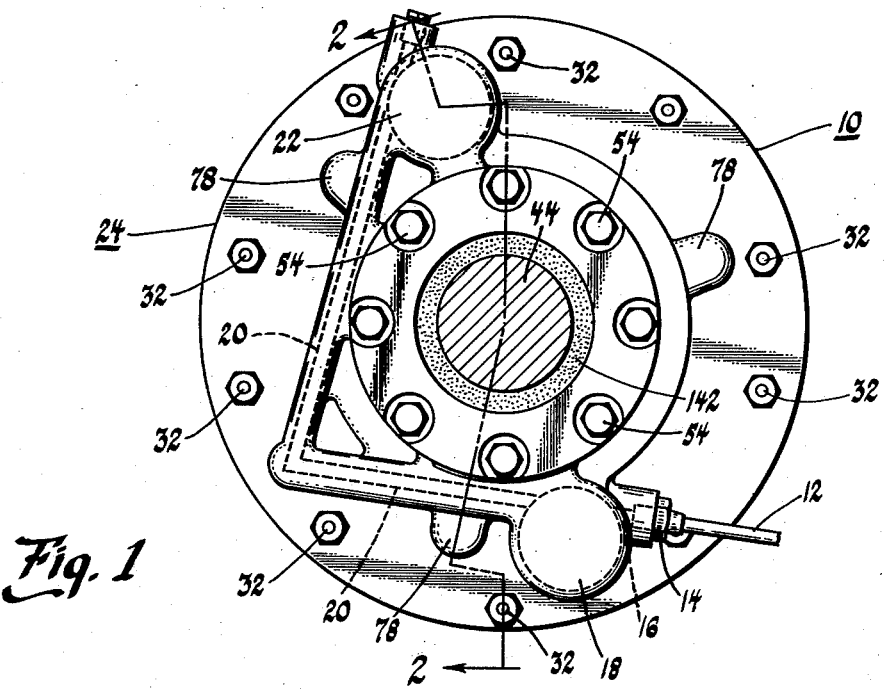
Figure 1 is a side elevational view of a brake structure incorporating features of the invention for a left front wheel of a motor vehicle as seen from line 1—1 of Figure 2.

The aforementioned and other objects are accomplished in the present invention by a front wheel structure in which a stationary part or steering knuckle serves as a pivot for a housing member in the usual manner using a kingpin or spindle. The housing, however, is modified to form communicating space, or chambers, with the pump and brake chambers immediately adjacent and forming part of the kingpin bore or boss portion of the housing. The steering knuckle is apertured in two places to provide passages to the spindle and chambers formed thereby with the housing. The kingpin is made with two axial passage or chamber portions extending inwardly from each end thereof and leaving a central partition. Two separate radial bores located on either side of the partition in the kingpin provide communication between each chamber portion of the kingpin and its corresponding passage in the steering knuckle. This structure provides passages for cooling fluid through the stationary steering knuckle eliminating sealing problems and flexible connections therefor.

The housing assembly provides journals for wheel shaft rotation in a conventional manner. It further provides stationary support for brake actuating parts including a pair of diametrically opposed brake pistons operable in a wheel cylinder upon an axially movable but non-rotatably disposed pressure or reaction plate. The pressure plate has an axially extending wall with slots engageable with radial projections of a plurality of braking discs non-rotatably supported thereby. The plate is biased against fluid pressure piston actuation by a wave-type retraction spring placed between the housing and axial wall of the reaction plate. Spaced radially inwardly, concentrically, and coplanar with the axially extending wall of the pressure plate is a pump body or housing carrying a plurality of cooperating rotatable braking discs. The pump body extends radially inwardly to an axially splined cylindrical portion engageable by cooperating splines on the rotatable wheel shaft. An annular slotted rotor or member is attached about the cylindrical portion of the pump body to rotate therewith. A positive displacement pump means is thus radially aligned and spaced concentrically with the brake means.

The housing member pivotally disposed on the kingpin provides a non-rotatable annular shoulder cooperable for brake disc engagement upon pressure plate actuation. The annular shoulder is engaged by a stop plate or disc upon pressure plate actuation and the coefficient of friction therewith is such that rotation of the disc is stopped more quickly than relative braking action of the disc brake members. The disc is carried by and stops rotation of a vane carrier. The vane carrier is rigidly attached to an annular pump member having an inner eccentric curvature and also retains the vanes of the vane pump in alignment with the slots of the rotating annular slotted rotor. When rotation of the carrier and eccentric member is stopped by braking action, the vane pump means becomes operable to force cooling fluid over the cooperating brake discs at a rate proportional to the rotational speed and braking action generating heat in stopping the wheel.

The eccentric annular member is recessed about its outer periphery to form an annular chamber with the inner surface of the axial pump body wall and the vane carrier. This chamber communicates with the pumping chamber of the vane pump through apertures in the narrow annular portion of the eccentric member and with a pump discharge chamber adjacent the inner radial portion of the braking discs through radial holes in the axial pump body wall and an annular slot between the pump body and vane carriage. Cooling fluid is pumped from the suction or low pressure chamber formed by the housing member and pump adjacent the one chamber portion of the kingpin through side apertures of the carrier to the discharge chamber of the pump, between the cooperable braking disc surfaces to the high pressure relief chamber adjacent the other chamber portion of the kingpin. The slots of the annular wall in the pressure plate provide communication for the fluid under high pressure from the pump body holes with the relief chamber from between grooved cooperable braking discs. Thus, the space associated with one chamber portion of the kingpin may be referred to as a high pressure chamber and the space associated with the other chamber portion of the kingpin as a low pressure chamber.

The cooling fluid is passed through suitable conduits connected with the stationary steering knuckle apertures to a conventional heat exchanger and reservoir. Similar cooling devices from other wheels can be connected to the heat exchanger and reservoir to operate in a manner as described.

With particular reference to Figure 1, the present invention provides a conventional brake actuating assembly shown generally by the numeral 10 including a conduit 12 for connecting a suitable source of brake fluid (not shown) to a fluid port 14 connected by a passageway 16 to a brake actuating cylinder 18. A further passageway 20 connects with a diametrically opposite brake cylinder 22. The brake cylinders 18 and 22 are formed integral with a brake cylinder structure 24.

Figure 2:
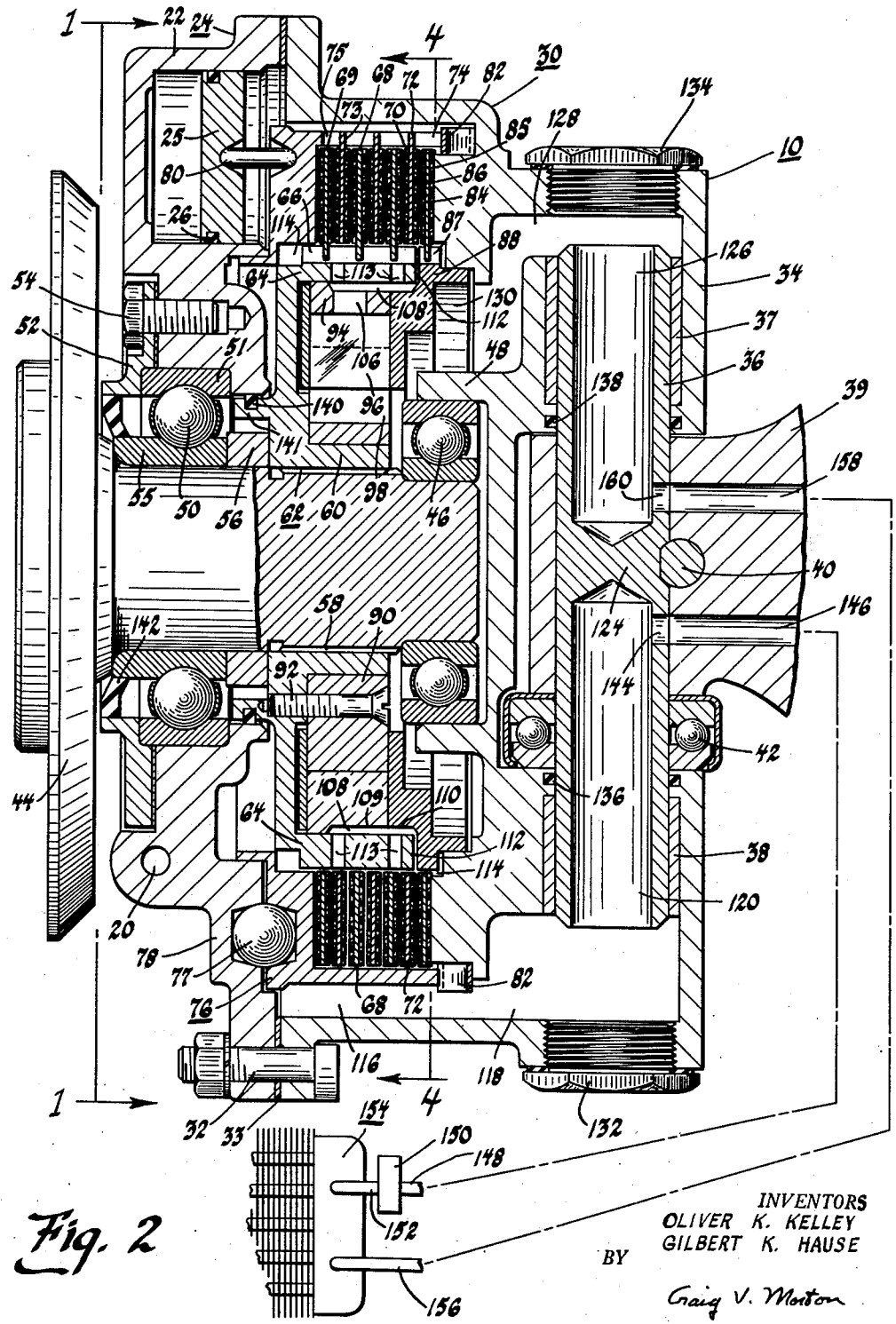
Figure 2 is a substantially vertical cross-sectional view taken along line 2—2 of Figure 1 showing the structure of the liquid-cooled motor-vehicle brake for a left front wheel viewed from the rear together with a schematic representation of a heat exchanger and reservoir connection in the present invention.

With particular reference to Figure 2, which is a substantially vertical cross-sectional view taken along line 2—2 of Figure 1, the brake cylinder structure 24 is shown with the brake cylinder 22 having a brake piston 25 reciprocally disposed therein. Sealing means 26 are disposed between the piston 25 and the inner periphery of the cylinder 22. The brake cylinder structure is bolted to a housing member indicated generally by the numeral 30 by means of nuts and bolts 32. A suitable sealing means or gasket 33 is disposed between the housing 30 and brake cylinder structure 24.

The housing 30 is formed integral with a boss portion 34 for pivotally mounting the housing 30 on a spindle 36. Bushings 37 and 38 are disposed between the boss 34 and longitudinally extending portions of the spindle 36. The spindle 36 is rigidly attached to a stationary part or steering knuckle 39 by means of a pin or key 40. An anti-friction thrust bearing 42 journals the lower portion of the steering knuckle 39 and cooperating kingpin 36 for pivotal action about the axis of the spindle 36.

The housing 30 and brake cylinder structure 24, when assembled, provide journals for wheel shaft rotation as follows. A wheel shaft or axle 44 is rotatably journalled through bearings 46 with an annular axially extending flange 48 and a second bearing 50 having outer race 51 attached by a retaining ring 52 through bolts 54 to the brake cylinder structure 24. An inner race 55 is press-fitted to the wheel axle 44 with a retaining ring 56 attached by shrink fitting to the wheel axle 44 serving to retain the wheel axle 44 in assembled relation in the housing.

The wheel axle 44 is provided with a plurality of external straight splines 58 cooperating with inwardly extending straight splines of a cylindrical portion 60 of a pump housing 62 causing the pump housing to rotate with the wheel axle 44. This rotation is simultaneous with axle rotation due to a wheel (not shown) which may be bolted to the wheel axle 44. The pump housing 62 is provided with an outer cylindrical portion, or wall, 64 provided with a plurality of longitudinal radially-extending flanges, splines, or ribs, 66 on which are mounted a plurality of radially extending brake discs 68. These brake discs 68 are rotatable and have braking surfaces 69 cooperable with braking surfaces 70 of a plurality of fixed brake discs 72 attached through radially extending projections 73 to an axially extending wall 74 having slotted openings as at 75 of a brake pressure or reaction plate 76. The reaction plate 76 is non-rotatably disposed in the housing 30 by means of three energizing or servo balls 77 disposed in pockets 78 formed with the brake cylinder structure 24. The three pockets 78 are shown in Figure 1. The reaction plate 76 is axially movable whenever piston 25 is actuated and movement of piston 25 is transferred through a pin or disc 80 causing the cooperating brake surfaces 69 and 70 to frictionally engage for stopping rotation of the wheel axle 44 and its wheel. The reaction plate is biased to a disengaging position of the cooperating brake surfaces 69 and 70 by a wave-type reaction spring 82 disposed between the axially extending wall 74 of the reaction plate 76 and the housing 30.

As shown in Figure 2, an additional brake plate 84 having cooperating braking surfaces 86 of greater frictional coefficient than the surfaces 69 and 70 is located in axial alignment with the other cooperating discs and engageable thereby with an annular portion 85 of the housing 30 to stop rotation of a vane carrier 88 to which the disc 84 is attached. A slotted rotor 90 is attached by screws 92 to the pump housing 62 to rotate therewith whenever the wheel axle rotates with the wheel. The vane carrier 88 has rigidly attached thereto an eccentric member 94 with a plurality of vanes 96 cooperating with the eccentric inner periphery of the member 94 and slots 98 of slotted member 90 to cause a pumping action whenever the eccentric member 94 is stopped from rotating. The disc 84 attached to the vane carrier 88 causes the eccentric member 94 to stop rotating which causes a pumping action with the slotted rotor 90 and vanes 96 directly proportional to the heat generated by cooperating brake surfaces 69 and 70 whenever the wheel axle 44 is stopped from rotating by actuation of the brake through reaction plate 76. The pump housing 62 together with the rotor 90 and eccentric member 94 are located radially inside and aligned with the brake discs 68 and 72.

Figure 4:
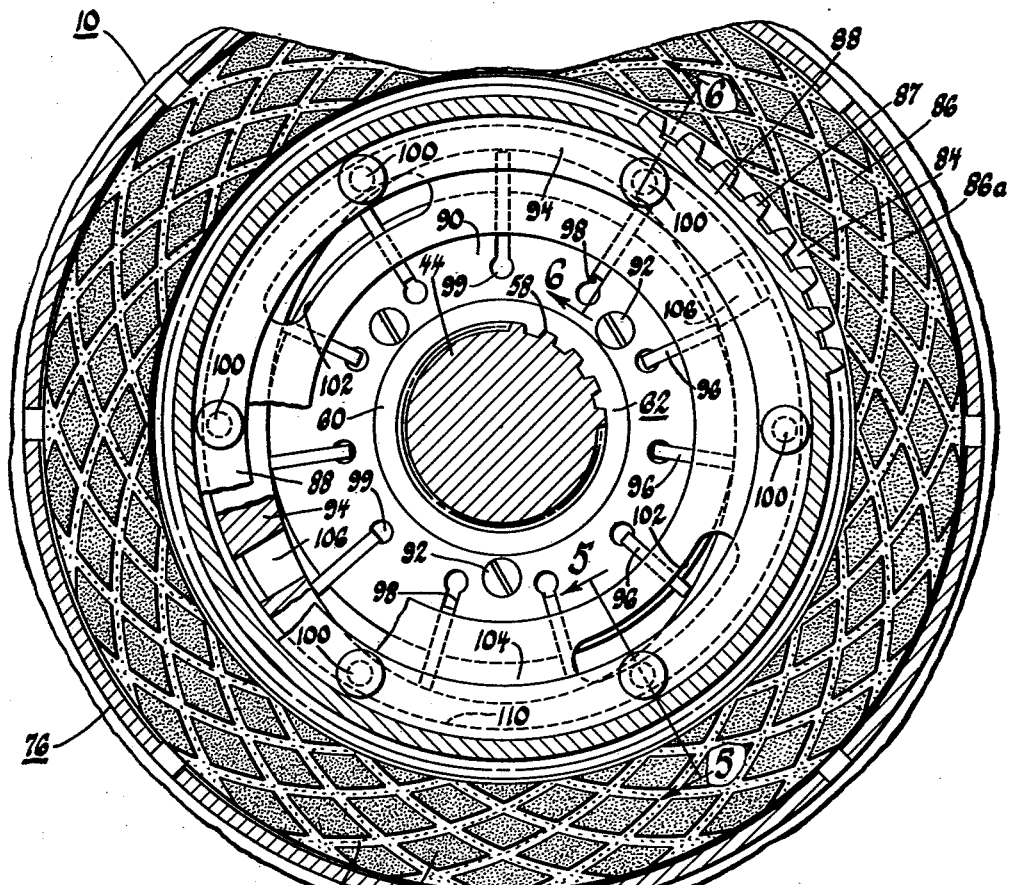
Figure 4 is a side elevational view of the concentrically located vane pump with a fragmentary sectional view thereof taken substantially along line 4—4 of Figure 2.

Figure 4 is a side elevational view with a fragmentary cross section of the vane carrier 88 and eccentric member 94 taken along line 4—4 of Figure 2. Figure 4 shows the disc 84 with braking surface 86 attached by means of cooperating splines 87 to the vane carrier 88. The friction material 86 of the plate 84 is grooved as at 86a such that cooling oil may be forced to flow between the plates when they are frictionally engaged. Grooving similar to that represented by 86a is provided in friction surfaces 69 and 70 of cooperating discs 68 and 72. Figure 4 also shows the radially extending projections 73 of discs 72 engaging the axially extending slotted wall 74 of the reaction plate 76. Figure 4 also shows shaft or axle 44 with cooperating splines 58 providing a driving connection with the pump housing 62 having the slotted rotor 90 attached by screws 92 to rotate therewith. The slots 98 are shown with the plurality of vanes 96 in various pumping positions in cooperation with the slotted rotor 90 and eccentric member 94. The vanes 96 are biased outwardly to engage the eccentric or cam surface of the member 94 by centrifugal force and by means of fluid pressure entering the slots 98 in their radial inward portion 99.

Figure 5:
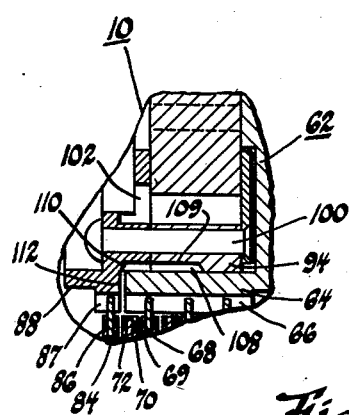
Figure 5 is a cross-sectional view of the vane carrier taken along line 5—5 of Figure 4.
Figure 6:
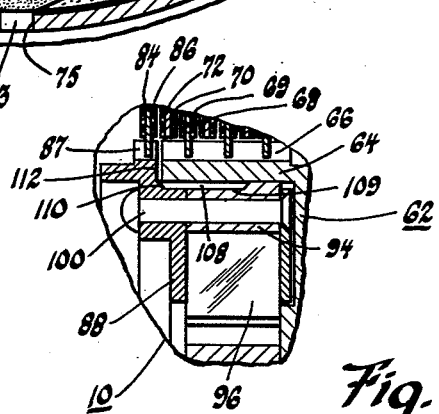
Figure 6 is a cross-sectional view of the vane carrier taken along line 6—6 of Figure 4.

Figure 6 is a cross-sectional view taken along line 6—6 of Figure 4 showing the fastening means such as rivets 100 attaching the eccentric member 94 to the vane carrier 88. Figure 5 is a cross-sectional view along line 5—5 of Figure 4 also showing the rivet 100 securing the eccentric member 94 to the vane carrier 88 together with an inlet aperture or opening 102 for the pump to draw cooling fluid into a pumping chamber 104 and then to outlet apertures 106 of the eccentric member 94 as shown in Figures 2 and 4. The pump outlet apertures 106 of the eccentric member 94 may be provided at diametrically opposite sides with dual inlet apertures 102 being provided in the vane carrier 88 as illustrated in Figure 4. The outlet apertures 106 communicate with an annularly extending peripheral recess 108 formed by a recessed portion 109 and 110 in the eccentric member 94 and vane carrier 88, respectively. This recess 108 communicates with a radially-extending annular passage 112 formed between the vane carrier 88 and axially extending outer wall portion 64 of the pump housing 62. Cooling fluid pumped by the vane pump through this passage 112 and a plurality of radial holes 113 in wall portion 64 enters an outlet chamber 114 with cooling fluid flowing between the cooperable braking discs 68, 72 and 84 by grooves such as 86a in the brake surfaces to an outer chamber, or recess, 116 formed with the housing 30 and the slotted openings 75 between the axially extending wall 74 of the reaction plate 76. The outer chamber 116 cooperates with a chamber passageway, or recess, 118 in the housing 30 with the chamber being completed by a longitudinally extending chamber-forming passageway 120 of the spindle 36 forming a part of the chambers 116—118. The passageway, or chamber portion, 120 of the spindle 36 is divided by a central partition 124 from a similar longitudinally extending chamber-forming passageway 126 extending in the opposite direction forming a portion of an inlet chamber, or recess, 128 in the housing 30 providing a high pressure chamber 130 cooperating through the apertures 102 of the vane carrier 88 with the pump as outlined above for fluid flow between the cooperating braking discs. Access caps 132 and 134 are threaded into sealing engagement with the housing 30 with the chamber portions 118 and 128, respectively. The access plug 134 permits assembly of the spindle 36 to the steering knuckle 39 by means of pin 40 when the housing 30 is being attached thereto. A pair of O-ring seals 136 and 138 provide a fluid seal for any cooling fluid which may leak past the bushings 37 and 38 disposed between the spindle 36 and housing 30. By means of these seals 136 and 138, fluid leakage is prevented from the chambers 118 and 120 along the cooperating assembly of the housing and spindle. An O-ring fluid seal 140 is also provided cooperating between an annular longitudinally-extending grooved flange 141 of the pump housing 62 and the brake cylinder structure 24 as well as another seal 142 between the bearing assembly plate 52 and inner raceway 55 of the ball bearing 50. This latter seal 142 prevents leakage and permits lubrication of all bearings with respect to the wheel axle or shaft 44.

As shown in Figure 2, the passage or outlet chamber portion 120 of spindle 36 communicates through a radially extending aperture 144 with an aperture 146 in steering knuckle 39 communicating with a conduit 148 connected to a reservoir 150 for cooling fluid. A conduit 152 communicates between the reservoir 150 and a heat exchanging means generally indicated by the numeral 154. A conduit 156 connects the heat exchanging means 154 to a passage 158 of the steering knuckle 39 which, in turn, communicates through a radially extending aperture 160 adjacent the partition 124 of spindle 36 providing an entrance passage to the passage or chamber portion 126 of spindle 36.

Figure 3:
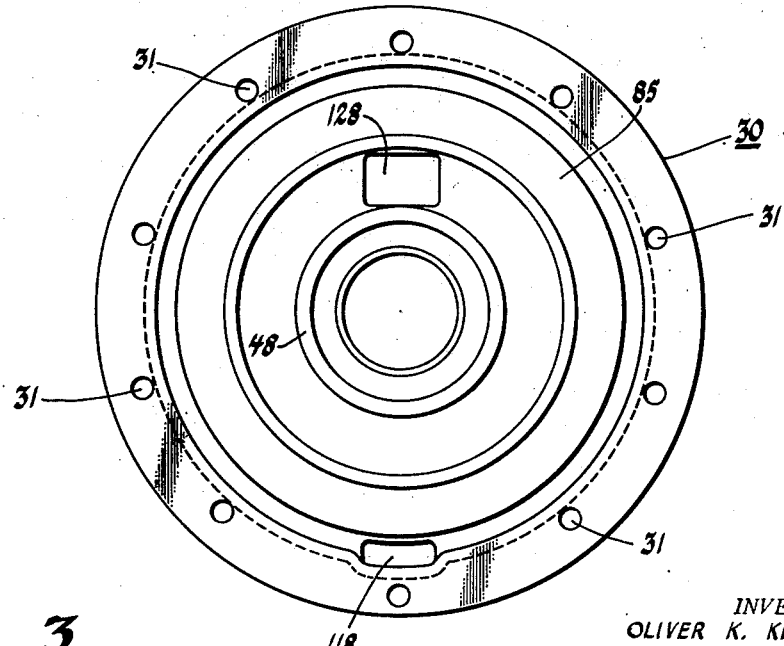
Figure 3 is a side elevational view of the steering-knuckle-pivoted housing member in the rear of the brake structure for the wheel shown in Figure 2.

Figure 3 is a side elevational view of the steering-knuckle-pivoted housing member 30 in un-assembled relationship at the rear of the brake structure for the wheel shown in Figure 2. A plurality of apertures 31 through which the assembly nuts and bolts 32 are fitted to attach the brake cylinder structure 24 thereto are shown in the outer periphery and the passage chambers 118 and 128 which cooperate with the spindle chamber portions 120 and 126, respectively, as shown in Figure 2, can be seen in their proper relationship. For purposes of clarity, other details clearly shown in the other drawings have been omitted in Figure 3.

In operation, the present invention provides a liquid-cooled disc brake having chambers, portions of which are formed with a spindle for pivotally mounting the housing containing both the cooling means and brake actuating means as described above. Structurally, the assembly provides a dynamically balanced assembly wherein the pump for the cooling means is located radially inside the cooperating brake discs through which cooling fluid is pumped from an inlet chamber to an outlet chamber communicating through suitable conduits with a reservoir and heat exchanging means as clearly shown in the drawings. Such a dynamically balanced assembly is advantageous for maintaining front wheel alignment and balance.

While the embodiment of the present invention as herein disclosed constitutes a preferred form, it is to be understood that other forms might be adopted.

What is claimed is as follows:

1. A liquid cooled friction brake comprising in combination, a heat exchanging means, cooperating engageable stationary and rotatable discs forming friction brake means, a pivotable housing non-rotatably enclosing said stationary discs, a fixed kingpin serving as a pivot for said housing, said kingpin having a pair of oppositely-extending longitudinal chamber-forming passages with a pair of centrally-located radial apertures for communication with said heat exchanging means, and rotatable pump means supporting said rotatable discs forming high and low pressure chambers with said housing and the longitudinal chamber-forming passages communicating with the radial apertures, the high and low pressure chambers communicating with each other by space between said cooperating engageable stationary and rotatable discs.

2. A liquid cooled friction brake comprising in combination, a heat exchanging means having inlet and outlet connections, a fixed spindle formed with oppositely-extending longitudinal chamber portions each capable of communicating through centrally-located radially-extending apertures in the spindle with the inlet and outlet connections of said heat exchanging means, a housing pivotally mounted on said spindle, a friction brake means including cooperating engageable stationary and rotatable discs operably disposed with said housing, a pump means including a rotatable axially-extending pump wall supporting said rotatable discs, said pump means forming a high pressure chamber in said housing with one of the longitudinal chamber portions of the spindle and a low pressure chamber in said housing with the other of the longitudinal chamber portions, said pump means being located radially inside and aligned with said brake discs, means providing communicating passage from one of said chambers to the pump means, and means providing communicating passage from said pump to the other of said chambers between said cooperating discs.

3. A liquid cooled friction brake comprising in combination, a heat exchanging means including inlet and outlet conduits, a steering knuckle, a spindle fixed to said knuckle having oppositely extending chamber-forming passages therein communicating with said conduits, a housing structurally recessed to complete high and low pressure chambers with the spindle chamber-forming passages pivotally mounted on said spindle, a wheel axle rotatably supported by said housing, a cooperating-disc braking means operably disposed in said housing, a reaction plate having an axially extending wall portion included in said braking means, stationary discs of said braking means being mounted on the axially extending wall portion of said reaction plate, a rotatable pump body located between the high and low pressure chambers, rotatable discs of said braking means being mounted on said pump body radially outside of and aligned therewith, a driving connection between said wheel axle and said pump body, a radially slotted annular pump rotor fixed to rotate with said pump body, a radially apertured eccentric member radially aligned with said slotted member and said rotatable brake discs, a vane carrier having an axial side aperture therein providing access to the interior of said pump body rigidly attached to said eccentric member, said carrier and eccentric member formed with a recess portion to provide a passage from said pump body between the apertured eccentric member to the braking discs, a plurality of vanes radially slidable in said slotted rotor, and a brake disc attached to said van carriage for quickly stopping rotation of said eccentric member to start pumping action proportional to braking force.

4. A brake cooling structure comprising in combination, a heat exchanging means, friction brake means including cooperating engageable stationary and rotatable discs, a pivotable housing operably containing said friction brake means, fluid connection means between the heat exchanging means and said housing, said housing being structurally recessed to form a portion of a high pressure cooling chamber with said cooperating discs, said housing being further structurally recessed to form a portion of a low pressure cooling chamber with said cooperating discs and communicating therebetween with the high pressure cooling chamber portion, and a stationary kingpin serving as a pivot for said housing having chamber-forming portions extending longitudinally therein in opposite directions to complement the high and low pressure chamber portions formed with said housing.

5. A liquid cooled disc brake comprising in combination, a source of liquid cooling means, a stationary steering knuckle, a spindle attached to said knuckle apertured to communicate with said source, a brake housing pivotally mounted on said spindle, friction brake means operably disposed in said housing including cooperating engageable stationary and rotatable discs, said housing being recessed to form portions of a pair of cooling chambers formed with said housing at opposite sides of said brake means, positive displacement pump means radially aligned and spaced concentrically with said brake means operably disposed between the chambers, said spindle having oppositely extending chamber-forming passages extending axially outwardly therein forming complementary portions of each of the chambers, and sealing means disposed between said housing and the chamber-forming portions of said spindle.

6. A brake mechanism adapted for circulation of cooling liquid between the stationary and movable friction elements, comprising a brake housing, a friction brake means including cooperating engageable stationary and rotatable discs operably disposed therein, a wheel axle rotatably journalled in said housing, a pump body rotatably coupled with said axle, said rotatable discs being radially attached to said body, a slotted rotor aligned with said discs attached inside said body, a plurality of vanes reciprocally disposed in said slots, a radially apertured annular member having an eccentric surface cooperable with said vanes for pumping action upon relative movement between said rotor and member, and a braking disc attached to said eccentric member cooperable with said brake means to cause pump actuation coincident with brake actuation.

7. A liquid cooled brake mechanism comprising in combination, heat exchanging means including inlet and outlet conduits, a stationary member, a hollow spindle attached to said member, a transverse partition dividing said spindle into separate chamber-forming portions with radial apertures in said spindle at opposite sides of said partition, means interconnecting the apertures and the inlet and outlet conduits, a brake housing pivotally supported by said spindle, friction brake means operably disposed in said housing, said housing being recessed to form complementary portions of a high pressure cooling chamber with the one chamber-forming portion of said spindle, said housing being recessed to form complementary low pressure cooling chamber portions with the other chamber portion of said spindle, and a positive displacement pump means disposed in radial alignment with said brake means effecting cooling flow through said heat exchanging means and the high and low pressure cooling chambers between said brake means.

No references cited.